(12) United States Patent
Zoso et al.

(10) Patent No.: US 11,007,107 B2
(45) Date of Patent: May 18, 2021

(54) EXOSKELETON STRUCTURE ADAPTED TO THE SHOULDER

(71) Applicant: SAFRAN ELECTRONICS & DEFENSE, Boulogne-Billancourt (FR)

(72) Inventors: Nathaniel Zoso, Quebec (CA); Jordane Grenier, Boulogne-Billancourt (FR)

(73) Assignees: SAFRAN ELECTRONICS & DEFENSE, Boulogne-Billancourt (FR); B-TEMIA INC., Quebec (CA)

( * ) Notice: Subject to any disclaimer, the term of this patent is extended or adjusted under 35 U.S.C. 154(b) by 0 days.

(21) Appl. No.: 16/758,686

(22) PCT Filed: Oct. 24, 2018

(86) PCT No.: PCT/FR2018/052642
§ 371 (c)(1),
(2) Date: Apr. 23, 2020

(87) PCT Pub. No.: WO2019/081851
PCT Pub. Date: May 2, 2019

(65) Prior Publication Data
US 2020/0375834 A1    Dec. 3, 2020

(30) Foreign Application Priority Data

Oct. 24, 2017 (FR) ...................................... 1760027

(51) Int. Cl.
*A61H 1/02* (2006.01)
*B25J 9/00* (2006.01)
(Continued)

(52) U.S. Cl.
CPC .......... *A61H 1/0281* (2013.01); *B25J 9/0006* (2013.01); *B25J 9/126* (2013.01);
(Continued)

(58) Field of Classification Search
CPC .......... A61H 1/0281; A61H 2201/1673; A61H 2001/0203; A61H 2201/1626;
(Continued)

(56) References Cited

U.S. PATENT DOCUMENTS 5,417,643 A * 5/1995 Taylor .................. A61H 1/0274
601/33
2007/0225620 A1  9/2007 Carignan et al.
(Continued)

FOREIGN PATENT DOCUMENTS

| EP | 3 156 193 A1 | 4/2017 |
| FR | 3 046 052 A | 6/2017 |
| JP | 5169469 B2 | 3/2013 |

OTHER PUBLICATIONS

International Search Report for PCT/FR2018/052642 dated Feb. 26, 2019 [PC/ISA/210].
(Continued)

*Primary Examiner* — Quang D Thanh
(74) *Attorney, Agent, or Firm* — Sughrue Mion, PLLC

(57) ABSTRACT

An exoskeleton structure includes a back assembly, an arm assembly, and a shoulder connection device. The shoulder connection device includes a first connection part, a first pivot connecting the first connection part to the back assembly while allowing rotation of the first connection part around a first axis of rotation, a second connection part, a second pivot connecting the first connection part to the second connection part while allowing rotation of the second connection part around a second axis of rotation orthogonal to the first axis, and a third pivot connecting the second connection part to the arm assembly while allowing rotation around a third axis of rotation orthogonal to the second axis of rotation. The second pivot is arranged so that the second axis of rotation forms a non-zero angle with an abduction/adduction axis of the shoulder and a non-zero angle with a flexion/extension axis of the shoulder.

13 Claims, 4 Drawing Sheets

Figure 1:
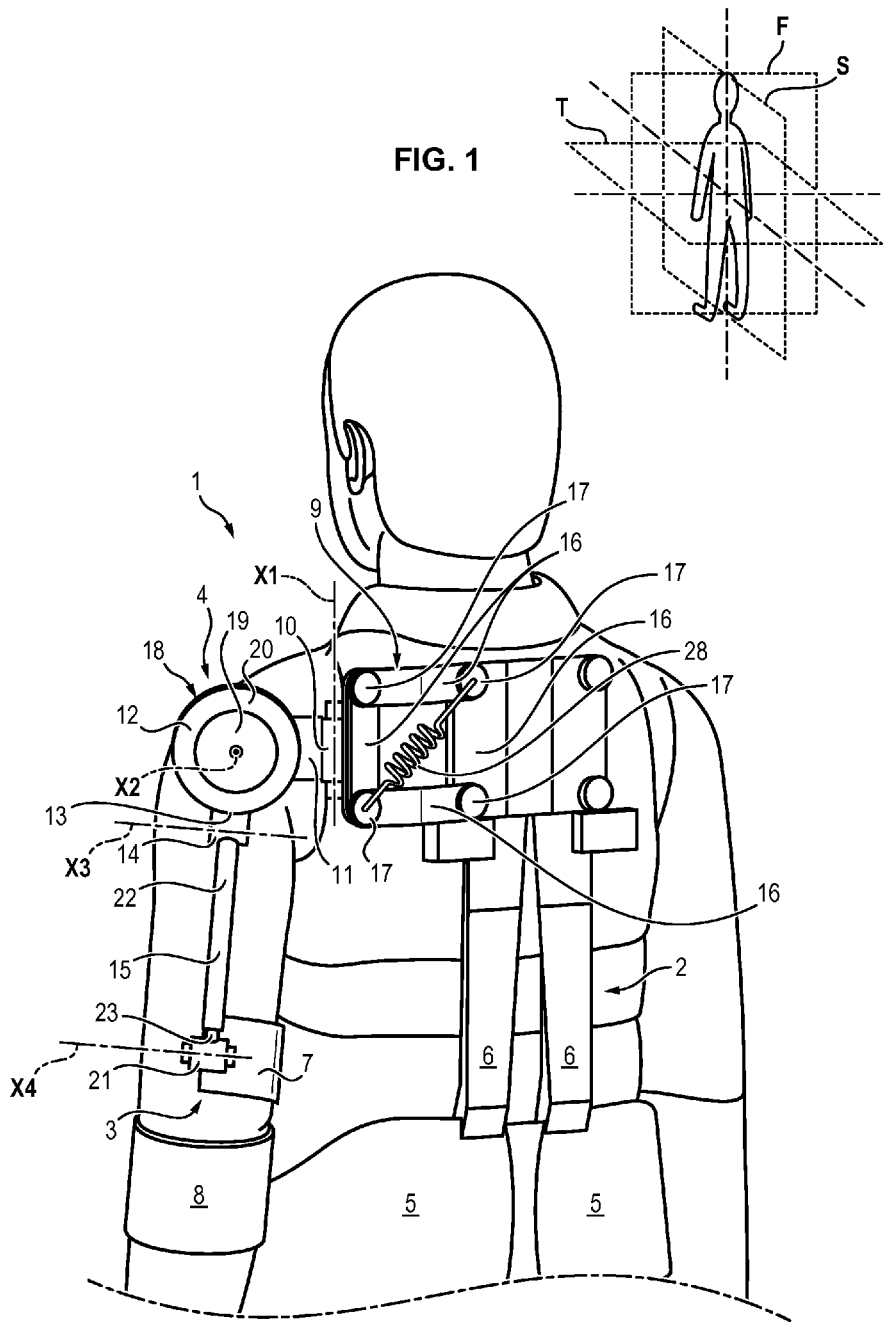

(51) Int. Cl.
*B25J 9/12* (2006.01)
*B25J 17/02* (2006.01)

(52) U.S. Cl.
CPC ... *B25J 17/0283* (2013.01); *A61H 2001/0203* (2013.01); *A61H 2201/1215* (2013.01); *A61H 2201/14* (2013.01); *A61H 2201/165* (2013.01); *A61H 2201/1626* (2013.01); *A61H 2201/1638* (2013.01); *A61H 2201/1673* (2013.01)

(58) Field of Classification Search
CPC ........ A61H 2201/1215; A61H 2201/14; A61H 2201/165; A61H 2201/1638; B25J 9/0006; B25J 9/126; B25J 17/0283
See application file for complete search history.

(56) References Cited

U.S. PATENT DOCUMENTS

| | | | | |
|---|---|---|---|---|
| 2008/0009771 | A1* | 1/2008 | Perry | B25J 9/0006 600/587 |
| 2009/0149783 | A1* | 6/2009 | Nef | A63B 23/03508 601/5 |
| 2010/0217163 | A1* | 8/2010 | Sankai | B25J 9/0006 601/5 |
| 2011/0251533 | A1* | 10/2011 | Han | A61H 1/0274 601/33 |
| 2011/0313331 | A1* | 12/2011 | Dehez | A61H 1/0277 601/33 |
| 2012/0101419 | A1* | 4/2012 | Bonutti | A61F 5/013 602/20 |
| 2012/0172769 | A1* | 7/2012 | Garrec | A61F 5/013 601/33 |
| 2013/0237883 | A1* | 9/2013 | Malosio | A61H 1/0274 601/33 |
| 2015/0360069 | A1* | 12/2015 | Marti | A63B 23/03508 482/6 |
| 2016/0206497 | A1* | 7/2016 | Deshpande | A61H 1/0281 |

OTHER PUBLICATIONS

Written Opinion for PCT/FR2018/052642 dated Feb. 26, 2019 [PC/ISA/237].

Communication dated Jul. 31, 2018, issued by the French Patent Office in counterpart Application No. 1760027.

* cited by examiner

EXOSKELETON STRUCTURE ADAPTED TO THE SHOULDER

CROSS REFERENCE TO RELATED APPLICATIONS

This application is a National Stage of International Application No. PCT/FR2018/052642 filed Oct. 24, 2018, claiming priority based on French Patent Application No. 1760027 filed Oct. 24, 2017, the entire contents of each of which are herein incorporated by reference in their entireties.

FIELD OF THE INVENTION

The invention relates to an exoskeleton structure.

PRIOR ART

Force assist exoskeletons are mechanical structures which duplicate the structure of the human skeleton and which allow improving the physical capacities of the human body.

There exist different types of force assist exoskeletons, which depend on the tasks to be accomplished by the user. Each type of exoskeleton allows limiting or reducing the force supplied by the user during the accomplishment of certain tasks.

There exist for example exoskeleton structures allowing a user to be assisted when he accomplishes tasks requiring movement of a shoulder, particularly for lifting and handling of loads.

However, these structures generally to not allow adaptation to all the movements of the shoulder. For example, these structures can allow a flexion and extension movement of the arm, but not allow an abduction and adduction movement of the arm.

However, the shoulder complex is a complex articular system having six cumulative degrees of freedom (combining the movements of the scapula and those of the shoulder as such).

Other structures have also been proposed, allowing better reproduction of the movements of the shoulder. However, these structures generally have considerable bulk, which hinders the mobility of the user.

Moreover, the integration of several actuators in these structures causes and increase of the mass and of the energy consumption of the structure.

Finally, it should be noted that, during certain sequences of movements of the shoulder, certain exoskeleton structures can pass through configurations called "singular points," which cause blockage of the structure. The blockage of the structure is the loss of a degree of freedom which occurs in configurations in which two of the axes of rotation of the structure are aligned with each other. These blocking situations require, as a minimum, carrying out the inverse of the sequence of movements having caused the singularity to free the user in his movements, and can even damage the exoskeleton structure and create discomfort for the user.

SUMMARY OF THE INVENTION

One goal of the invention is to propose an exoskeleton structure which provides greater freedom of movement of the shoulder, while still being compact.

This goal is achieved within the scope of the present invention due to an exoskeleton structure comprising:
a back assembly intended to be attached to the back of a user,
an arm assembly intended to be attached to an arm of the user,
a shoulder connection device connecting the back assembly to the arm assembly, the shoulder connection device comprising a first connection part, a first pivot connecting the first connection part to the back assembly, while allowing rotation of the first connection part relative to the back assembly around a first axis of rotation parallel to an internal/external axis of rotation of the shoulder of the user, a second connection part, a second pivot connecting the first connection part to the second connection part while allowing rotation of the second connection part relative to the first connection part around a second axis of rotation orthogonal to the first axis of rotation, a third pivot connecting the second connection part to the arm assembly while allowing rotation of the arm assembly relative to the second connection part around a third axis of rotation orthogonal to the second axis of rotation,
in which the second pivot is arranged so that the second axis of rotation forms a non-zero angle with an abduction/adduction axis of the shoulder of the user and a non-zero angle with a flexion/extension axis of the shoulder of the user when the user is standing, arms relaxed along the body.

In a structure of this type, the second axis of rotation forms a non-zero angle both with an abduction/adduction axis of the shoulder of the user and with a flexion/extension axis of the shoulder of the user. It is therefore possible to design a structure in which a single actuator allows both assisting the user during an abduction/adduction movement of the shoulder and during a flexion/extension movement of the shoulder, which allows reducing the mass of the structure and its energy consumption.

In addition, with this configuration of the second axis of rotation, the user can for example successively accomplish flexion movements of the shoulder, then adduction of the scapula, then an extension movement of the shoulder without having the connection device pass through a singular point, which avoids creating blockage situations.

The proposed structure can also have the following features:
the third pivot is arranged so that the third axis of rotation is orthogonal to the first axis of rotation, when the user is standing, arms relaxed along the body,
the structure comprises an actuator including a stator and a rotor mounted in rotation relative to the stator, one of the stator and the rotor being mounted fixed on the first connection part, and the other of the stator and the rotor being mounted fixed on the second connection part, the actuator being capable of generating a torque to drive in rotation the second connection part relative to the first connection part,
the arm assembly comprises an arm part capable of being supported against the arm of the user to drive the arm of the user in rotation relative to the back of the user, by means of the actuator,
the arm assembly comprises a first arm part capable of surrounding the arm of the user to attach the first arm part to the arm of the user, and a second arm part mounted in rotation relative to the first arm part so as to allow rotation of the arm of the user relative to the second arm part, while still being capable of supporting the first arm part against the arm of the user to drive the arm in rotation by means of the actuator, the arm assembly comprises a third connection part and a fourth pivot, the third connection part having a first end connected to the shoulder connection device by means of the third pivot, and a second end connected to the arm part by means of the fourth pivot, the fourth pivot allows rotation of the arm part relative to the third connection part around a fourth axis of rotation parallel to the third axis of rotation, the third connection part includes two parts mounted sliding relative to one another by means of a runner, the sliding of the parts relative to one another allowing shortening or lengthening of the third connection part during rotation of the arm assembly relative to the back assembly, the arm assembly comprises a forearm part capable of surrounding the forearm of the user to attach the arm assembly to the arm of the user, while still allowing rotation of the arm of the user inside the forearm part during an internal/external rotation movement of the shoulder, the arm assembly comprises a fifth pivot connecting the forearm part to the arm part and allowing rotation of the forearm part relative to the arm part around a fifth axis of rotation during rotation of the elbow of the user, the connection device comprises a four-bar mechanism connecting the back assembly to the first pivot, the four-bar mechanism comprising four bars, and four hinges connecting the bars to one another by forming a deformable parallelogram, each hinge of the four-bar mechanism has an axis of rotation, each axis of rotation extending parallel to a direction orthogonal to a frontal plane of the user, the connection device also comprises an elastic return member capable of exerting a return force tending to oppose deformation of the parallelogram.

PRESENTATION OF THE DRAWINGS

Figure 2:
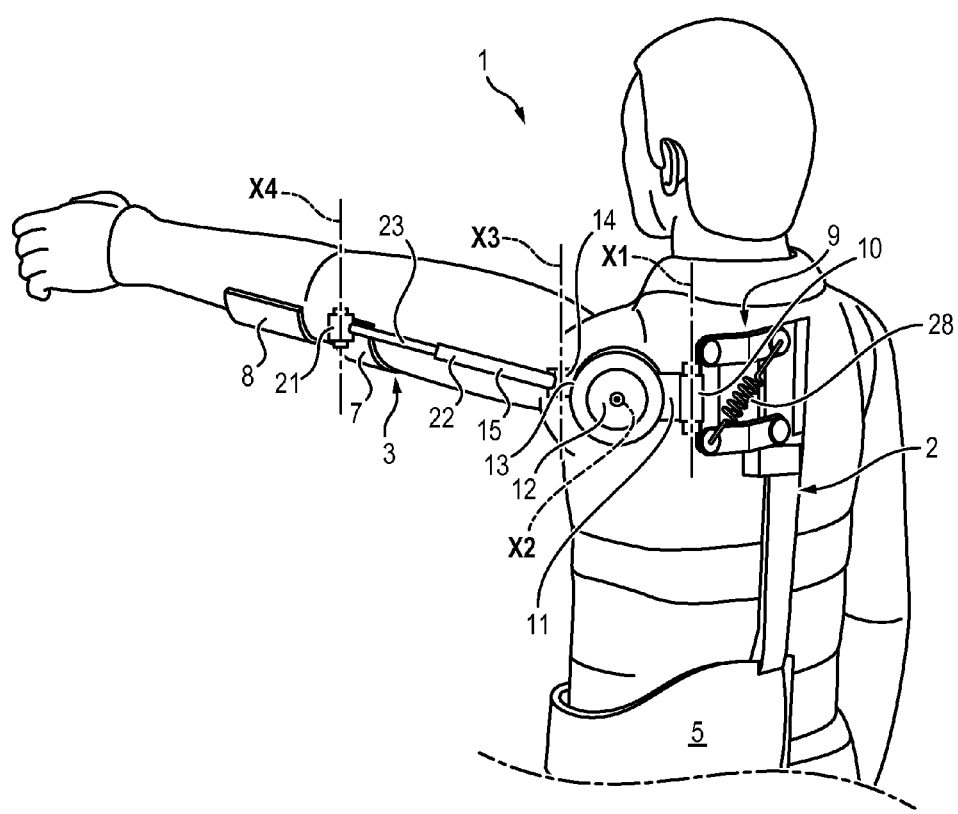
Figure 3:
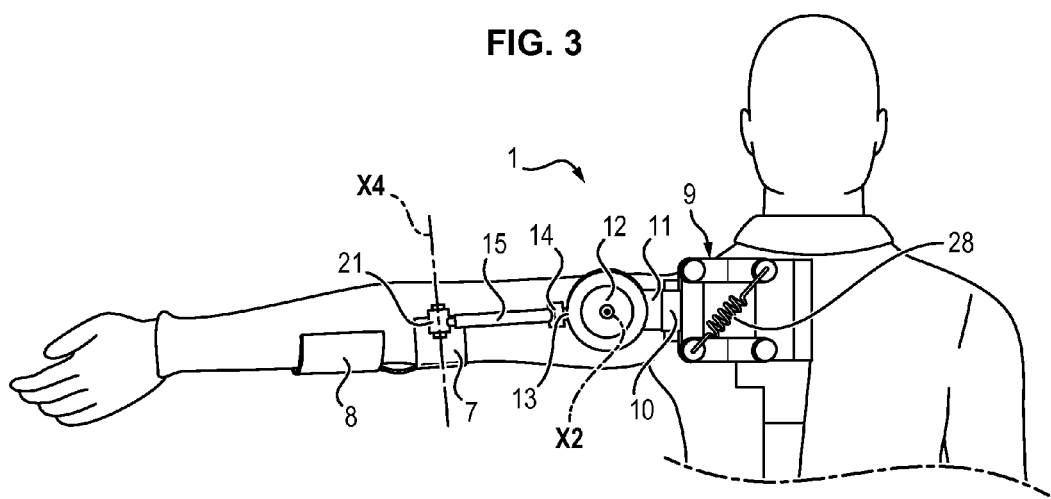
Figure 4:
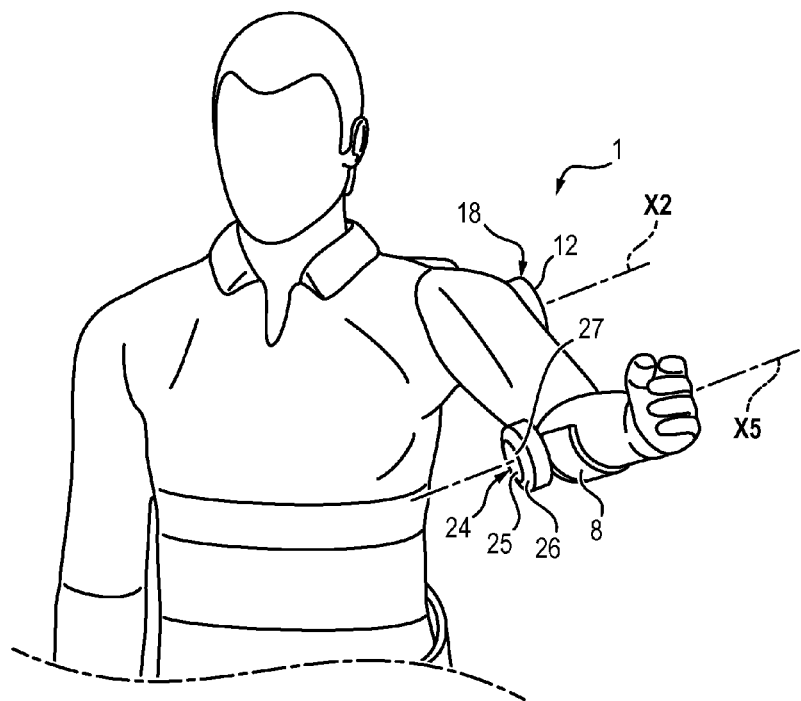
Figure 5:
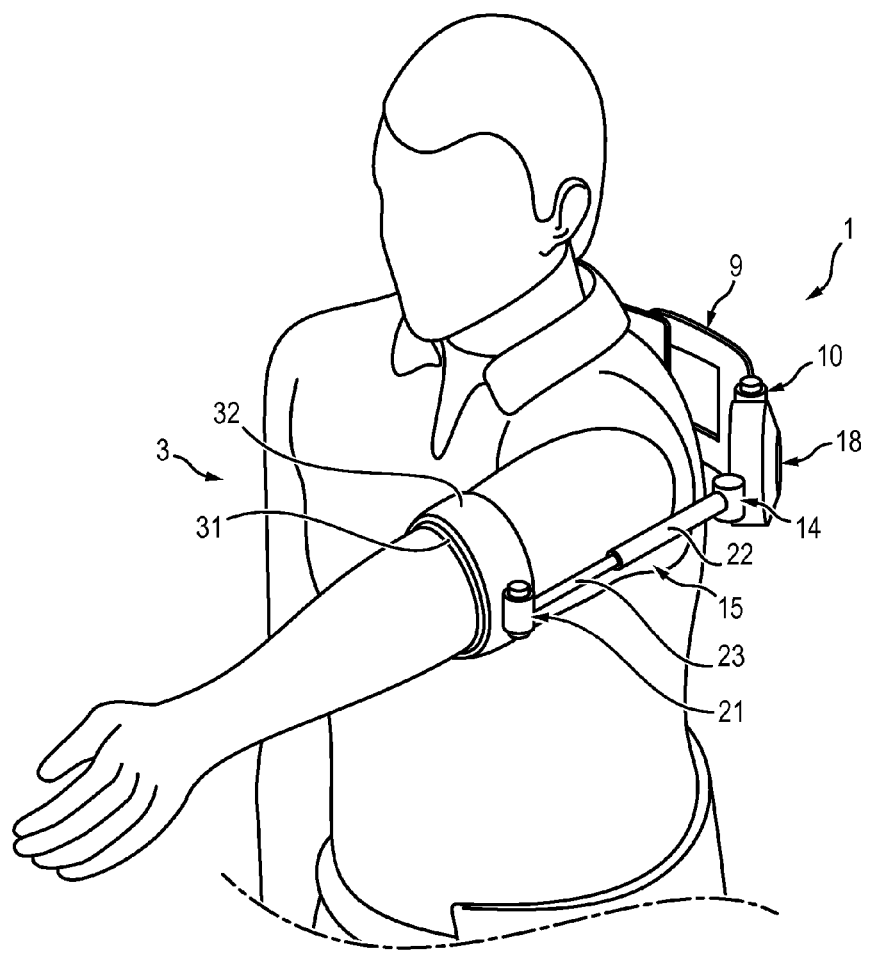

Other features and advantages will also be revealed by the description that follows, which is purely illustrative and not limiting, and must be read with reference to the appended drawings, in which:

FIG. 1 shows schematically an exoskeleton structure conforming to one possible embodiment of the invention, in a configuration in which the user is standing, arms relaxed along the body, FIG. 2 shows schematically the exoskeleton structure, in a configuration in which the user is standing, arm extended forward, after having executed a flexion movement of the shoulder, FIG. 3 shows schematically the exoskeleton structure, in a configuration in which the user is standing, arm extended sideways, after having executed successively a flexion movement of the shoulder, then an abduction movement of the shoulder, FIG. 4 represents schematically the exoskeleton structure during a flexion movement of the elbow of the user, FIG. 5 shows schematically a variant of the exoskeleton structure of FIGS. 1 to 4.

DETAILED DESCRIPTION OF ONE EMBODIMENT

FIG. 1 illustrates a frontal plane F, a sagittal plane S and a transverse plane T of the user. In known fashion, the sagittal plane S is defined as a plane parallel to the median plane which separates the left half from the right half of the body of the user. The frontal plane F or coronal plane is defined as a plane perpendicular to the medium plane and which separates the body into an anterior or ventral portion and a posterior or dorsal portion. The transverse plane T or transversal plane is defined as a plane perpendicular to the median plane and which separates the body into an upper portion (toward the head) and a lower portion (toward the feet).

In FIG. 1, the user is standing, arms relaxed along the body. The user is equipped with an exoskeleton structure 1 allowing assisting the movements of his shoulder.

The exoskeleton structure 1 comprises a back assembly 2 which, in normal use, is attached to the back of a user, an arm assembly 3 attached to an arm of the user and a shoulder connection device 4 connecting the back assembly 2 to the arm assembly 3.

The back assembly 2 comprises for example a belt 5 surrounds the lower trunk of the user, and a back part 6 attached to the lumbar belt 5 and extending along the vertebral column of the user.

The arm assembly 3 comprises an arm part 7 capable of being supported against the arm of the user and a forearm part 8 capable of surrounding the forearm of the user to attach the arm assembly 3 to the arm of the user.

The shoulder connection device 4 comprises a four-bar mechanism 9, a first pivot 10, a first connection part 11, a second pivot 12, a second connection part 13, a third pivot 14 and a third connection part 15.

The four-bar mechanism 9 connects the back assembly 2 to the first pivot 10. The four-bar mechanism 9 comprises four bars 16, and four hinges 17 connecting the bars 16 to each other while forming a deformable parallelogram. Each hinge 17 of the four-bar mechanism 9 has an axis of rotation, each axis of rotation extending parallel to a direction orthogonal to the frontal plane F of the user, in normal use.

The shoulder connection device 9 also comprises an elastic return member 28 capable of applying to the four-bar mechanism 9 a return force tending to oppose the deformation of the parallelogram caused by the weight of the shoulder connection device 4 and of the arm assembly 3. More precisely, the elastic return member 28 comprises a spring extending between two hinges situated at the two opposite vertices of the parallelogram. In the example illustrated in FIG. 1, the spring is a tension spring connecting one of the hinges 28 situated in an upper vertex, closest to the sagittal plane, to another of the hinges 28 situated in a lower vertex, the farthest away from the sagittal plane. Thus, the return force exerted by the tension spring tends to pull the arm assembly upward relative to the back assembly 2, so as to compensate the weight exerted by the shoulder connection device and by the arm assembly. The stiffness of the elastic return member 28 can be adjusted depending on the weight to be compensated.

The first pivot 10 connects the first connection part to the four-bar mechanism 9. The first pivot 10 allow rotation of the first connection part 11 relative to the back assembly 2, around a first axis of rotation X1 parallel to an internal/external axis of rotation of the shoulder of the user.

The second pivot 12 connects the first connection part 11 to the second connection part 13. The second pivot 12 allows rotation of the second connection part 13 relative to the first connection part 11 around a second axis of rotation X2 orthogonal to the first axis of rotation X1.

The second pivot 12 is arranged so that the second axis of rotation X2 forms a non-zero angle with an abduction/ adduction axis of the shoulder of the user and a non-zero angle with a flexion/extension axis of the shoulder of the user when the user is standing, arms relaxed along the body as illustrated in FIG. 1.

The third pivot 14 connects the second connection part 13 to the third connection part 15. The third pivot allow rotation of the arm assembly 3 relative to the second connection part 13 around a third axis of rotation X3 orthogonal to the second axis of rotation X2.

The third pivot 14 is arranged so that the third axis of rotation X3 is orthogonal to the first axis of rotation X1 and to the second axis of rotation X2, when the user is standing, arms relaxed along the body. Moreover, the third axis of rotation X3 forms a non-zero angle with the abduction/adduction axis of the shoulder of the user and a non-zero angle with the flexion/extension axis of the shoulder of the user when the user is standing, arms relaxed along the body.

Due to the first pivot 10, at the second pivot 12 and at the third pivot 14, the connection device 4 allows rotation of the arm assembly 3 relative to the back assembly 8 with three degrees of freedom.

The exoskeleton structure 1 also comprises an actuator 18 including a stator 19 and a rotor 20 mounted in rotation relative to the stator 19. The stator 19 is for example mounted fixed on the first connection part 11 and the rotor 20 is for example mounted fixed on the second connection part 13. The actuator 18 is capable of generating a torque to drive in rotation the second connection part 13 relative to the first connection part 11. The actuator can comprise for example an electric motor of the brushless or gearmotor type.

The actuator 18 can be activated to assist the arm of the user during an abduction/adduction and/or flexion/extension movement of the shoulder of the user, i.e. to provide and additional force which is added to the force produced by the user to produce the movement of the shoulder.

The arm assembly 3 also comprises a fourth pivot 21. The fourth pivot 21 connects the third connection part 15 to the arm part 7. The fourth pivot 21 allows rotation of the arm part 7 relative to the third connection part 15 around a fourth axis of rotation X4 parallel to the third axis of rotation X3.

The third connection part 15 has a first end connected to the second connection part 13 by means of the third pivot 14, and a second end connected to the arm part 7 by means of the fourth pivot 21.

Moreover, the third connection part 15 comprises two parts 22 and 23 mounted sliding relative to one another by means of a runner. The axial sliding of the parts 22 and 23 relative to one another allows shortening or lengthening of the third connection part 15 during rotation of the arm assembly 3 relative to the back assembly 2, which allows accommodating a misalignment of the axes of rotation X1, X2 and X3 with the real center of rotation of the shoulder of the user.

Moreover, the part 23 is mounted in rotation relative to the part 22 around the sliding axis of the part 23 relative to the part 22.

Finally, the forearm part 8 allow rotation of the shoulder inside the forearm part 8 during an internal-external rotation movement of the shoulder.

FIG. 2 shows schematically the exoskeleton structure 1, when the user is standing, arm extended forward, after having executed a flexion movement of the shoulder.

The flexion movement of the shoulder causes both a rotation of the second connection part 13 relative to the first connection part 11 around the second axis of rotation X2 and a rotation of the third connection part 15 relative to the second connection part 13 around the third axis of rotation X3.

The flexion movement can be assisted by the activation of the actuator 18. In fact, when it is activated, the actuator 18 generates a torque tending to drive in rotation the second connection part 13 relative to the first connection par 11, and consequently to support the arm part 7 on the arm of the user to assist the arm during flexion movement of the shoulder. The arm part 7 is supported against the arm of the user to drive the arm of the user in flexion or in extension relative to the scapula of the user, by means of the actuator 18.

As illustrated in FIG. 2, once the arm of the user extends horizontally forward, the first axis of rotation X1 is positioned parallel to the third axis of rotation X3.

FIG. 3 shows schematically the exoskeleton structure, when the user is standing, arm extended to the side, after having executed successively a flexion movement of the shoulder and an abduction movement of the shoulder.

The abduction movement of the shoulder causes both a rotation of the second connection part 13 relative to the first connection part 11 around the first axis of rotation X1 and a rotation of the third connection part 15 relative to the second connection part 13 around the third axis of rotation X3.

The abduction movement can be assisted by the actuator 18. In fact, when it is activated, the actuator 18 generates a torque tending to drive in rotation the second connection part 13 relative to the first connection part 11, and consequently to support the arm part 7 on the arm of the user to drive the arm in rotation. The arm part 7 is supported against the arm of the user to drive the arm of the user in abduction or in adduction relative to the scapula of the user, by means of the actuator 18.

Thus, the actuator 18 serves both to assist the user during a flexion/extension movement of the shoulder, and during an abduction/adduction movement of the shoulder.

In addition, as illustrated in FIG. 3, once the arm of the user is extended horizontally to the side, the first axis of rotation X1, the second axis of rotation X2 and the third axis of rotation X3 are not aligned two by two. The connection device 4 avoid passing through singular points which could cause blockage of the exoskeleton structure 1. Moreover, the effectiveness of the actuator is retained.

As illustrated in FIG. 4, the arm assembly 3 also comprises a fifth pivot 27 connection the forearm part 8 to the arm part 7. The fifth pivot allows rotation of the forearm part 8 relative to the arm part 7 around a fifth axis of rotation X5 during rotation of the elbow of the user. More precisely, the fifth pivot 27 allows rotation of the forearm part 8 relative to the arm part 7 around a fifth axis of rotation X5 during a flexion or extension movement of the elbow of the user.

The exoskeleton structure can also comprise a second actuator 24 including a stator 25 and a rotor 26 mounted in rotation relative to the stator 25. The stator 25 is for example mounted fixed on the arm part 7 and the rotor is for example mounted fixed on the forearm part 8. The actuator 24 is capable of generating a torque to drive in rotation the forearm part 8 relative to the arm part 7. The actuator 24 can comprise for example an electric motor of the brushless or gearmotor type.

The actuator 24 can be activated to assist the arm of the user during a flexion/extension movement of the elbow of the user, i.e. to provide an additional force which is added to the force produced by the user to produce the movement of the elbow.

FIG. 5 illustrates a variant of the exoskeleton structure of FIGS. 1 to 4. The exoskeleton structure illustrated in FIG. 5 is identical to the exoskeleton structure illustrated in FIGS. 1 to 4, with the exception of the arm assembly 3.

In this variant, the arm assembly 3 comprises a first arm part 31 capable of surrounding the arm of the user to attach the arm assembly 3 to the arm of the user, and a second arm part 32 mounted in rotation relative to the first arm part 32. More precisely, in the example illustrated in FIG. 5, the second arm part 32 surrounds the first arm part 31, while still allowing rotation of the first arm part 31 (and therefore rotation of the arm of the user) relative to the second arm part 32.

The third pivot 14 connects the third connection part 15 to the arm part 7 by means of the fourth pivot 21.

In the example illustrated in FIG. 5, the arm assembly 3 does not comprise a forearm part 8. However, the arm assembly could also include a forearm part 8 connected to the second arm part 32 by means of a fifth pivot 27, as illustrated in FIGS. 1 to 4.

The invention claimed is:

1. An exoskeleton structure comprising:
a back assembly intended to be attached to a back of a user;
an arm assembly intended to be attached to an arm of the user; and
a shoulder connection device connecting the back assembly to the arm assembly, the shoulder connection device comprising a first connection part, a first pivot connecting the first connection part to the back assembly while allowing rotation of the first connection part relative to the back assembly around a first axis of rotation parallel to an internal/external axis of rotation of a shoulder of the user, a second connection part, a second pivot connecting the first connection part to the second connection part while allowing rotation of the second connection part relative to the first connection part around a second axis of rotation orthogonal to the first axis of rotation, a third pivot connecting the second connection part to the arm assembly while allowing rotation of the arm assembly relative to the second connection part around a third axis of rotation orthogonal to the second axis of rotation,
wherein the second pivot is arranged so that the second axis of rotation forms a non-zero angle with an abduction/adduction axis of the shoulder of the user and a non-zero angle with a flexion/extension axis of the shoulder of the user when the user is standing, arms relaxed along a body of the user.

2. The exoskeleton structure according to claim 1, wherein the third pivot is arranged so that the third axis of rotation is orthogonal to the first axis of rotation, when the user is standing, arms relaxed along the body of the user.

3. The exoskeleton structure according to claim 1, comprising an actuator including a stator and a rotor mounted in rotation relative to the stator, one of the stator and the rotor being mounted fixed on the first connection part, and the other of the stator and the rotor being mounted fixed on the second connection part, the actuator being capable of generating a torque to drive in rotation the second connection part relative to the first connection part.

4. The exoskeleton structure according to claim 3, wherein the arm assembly comprises an arm part capable of being supported against the arm of the user to drive the arm in rotation by means of the actuator.

5. The exoskeleton structure according to claim 3, wherein the arm assembly comprises a first arm part capable of surrounding the arm of the user and adapted to attach the first arm part to the arm of the user, and a second arm part mounted in rotation relative to the first arm part so as to allow rotation of the arm of the user relative to the second arm part while still being capable of supporting the first arm part against the arm of the user to drive the arm of the user in rotation by means of the actuator.

6. The exoskeleton structure according to claim 4, wherein the arm assembly comprises a third connection part and a fourth pivot, the third connection part having a first end connected to the shoulder connection device by means of the third pivot, and a second end connected to the arm part by means of the fourth pivot.

7. The exoskeleton structure according to claim 6, wherein the fourth pivot allows rotation of the arm part relative to the third connection part around a fourth axis of rotation parallel to the third axis of rotation.

8. The exoskeleton structure according to claim 6, wherein the third connection part includes two parts mounted sliding relative to one another by means of a runner, so as to allow shortening or lengthening of the third connection part during rotation of the arm assembly relative to the back assembly.

9. The exoskeleton structure according to claim 1, wherein the arm assembly comprises a forearm part capable of surrounding a forearm of the user and adapted to attach the arm assembly to the arm of the user, while still allowing rotation of the arm of the user inside the forearm part during an internal-external rotation movement of the shoulder.

10. The exoskeleton structure according to claim 4, wherein the arm assembly comprises a forearm part capable of surrounding a forearm of the user and adapted to attach the arm assembly to the arm of the user, while still allowing rotation of the arm of the user inside the forearm part during an internal-external rotation movement of the shoulder, and
wherein the arm assembly comprises a fifth pivot connecting the forearm part to the arm part and allowing rotation of the forearm part relative to the arm part around a fifth axis of rotation during rotation of an elbow of the user.

11. The exoskeleton structure according to claim 1, wherein the shoulder connection device comprises a four-bar mechanism connecting the back assembly to the first pivot, the four-bar mechanism comprising four bars and four hinges connecting the four bars to one another by forming a deformable parallelogram.

12. The exoskeleton structure according to claim 11, wherein each hinge of the four-bar mechanism has an axis of rotation, each axis of rotation extending parallel to a direction orthogonal to a frontal plane of the user.

13. The exoskeleton structure according to claim 11, wherein the shoulder connection device also comprises an elastic return member capable of exerting a return force tending to oppose deformation of the deformable parallelogram.

* * * * *